(12) United States Patent
Wykoff, II et al.

(10) Patent No.: US 10,099,539 B2
(45) Date of Patent: Oct. 16, 2018

(54) VARIABLE TRANSMISSION MOON ROOF MODULE WITH MULTIPLE TRANSPARENT PANELS

(71) Applicant: FORD GLOBAL TECHNOLOGIES, LLC, Dearborn, MI (US)

(72) Inventors: Richard H. Wykoff, II, Commerce Township, MI (US); Kenneth Edward Nietering, Dearborn, MI (US); Timothy J. Potter, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/411,200

(22) Filed: Jan. 20, 2017

(65) Prior Publication Data
US 2018/0208027 A1 Jul. 26, 2018

(51) Int. Cl.
*B60J 3/06* (2006.01)
*B60J 3/04* (2006.01)
*B60J 10/82* (2016.01)
*B60J 7/057* (2006.01)
*B60J 7/043* (2006.01)
*G02B 27/28* (2006.01)
*G02B 26/02* (2006.01)

(52) U.S. Cl.
CPC . *B60J 3/06* (2013.01); *B60J 3/04* (2013.01); *B60J 7/043* (2013.01); *B60J 7/0573* (2013.01); *B60J 10/82* (2016.02); *G02B 26/023* (2013.01); *G02B 27/281* (2013.01)

(58) Field of Classification Search
CPC .................. B60J 7/22; B60J 3/04; B60J 3/06
USPC .......................................... 296/223, 211, 214
See application file for complete search history.

(56) References Cited

U.S. PATENT DOCUMENTS

| | | | |
|---|---|---|---|
| 4,185,868 A | 1/1980 | Kaltz et al. | |
| 4,809,867 A * | 3/1989 | Choi | G11B 33/027 220/211 |
| 5,405,184 A * | 4/1995 | Jardin | B60J 7/003 296/211 |
| 5,507,547 A * | 4/1996 | Hattass | B60J 7/003 296/211 |
| 5,558,394 A * | 9/1996 | Mori | B60J 7/003 296/214 |
| 6,592,178 B2 * | 7/2003 | Schober | B60J 7/0015 180/271 |
| 6,837,022 B2 | 1/2005 | Ito | |
| 7,393,048 B2 | 7/2008 | Mori | |

(Continued)

FOREIGN PATENT DOCUMENTS

CN 203780279 U 8/2014

OTHER PUBLICATIONS

English Machine Translation of CN203780279U.

*Primary Examiner* — Dennis H Pedder
(74) *Attorney, Agent, or Firm* — Jason Rogers; King & Schickli, PLLC

(57) ABSTRACT

A moon roof module includes a first transparent panel, a second transparent panel and a third transparent panel packaged in a compartment between the first transparent panel and the second transparent panel. The moon roof module also includes an actuator configured to displace the third transparent panel between a first position and a second position. A related method of switching a moon roof module between a transparent state and an opaque state is also disclosed.

14 Claims, 6 Drawing Sheets

(56) References Cited

U.S. PATENT DOCUMENTS

| | | | |
|---|---|---|---|
| 8,382,200 B2* | 2/2013 | Mathes | B60J 3/06 296/211 |
| 8,570,367 B2* | 10/2013 | Chang | G02B 27/2214 348/59 |
| 2005/0002081 A1 | 1/2005 | Beteille et al. | |
| 2007/0097503 A1 | 5/2007 | Tsuji | |

* cited by examiner

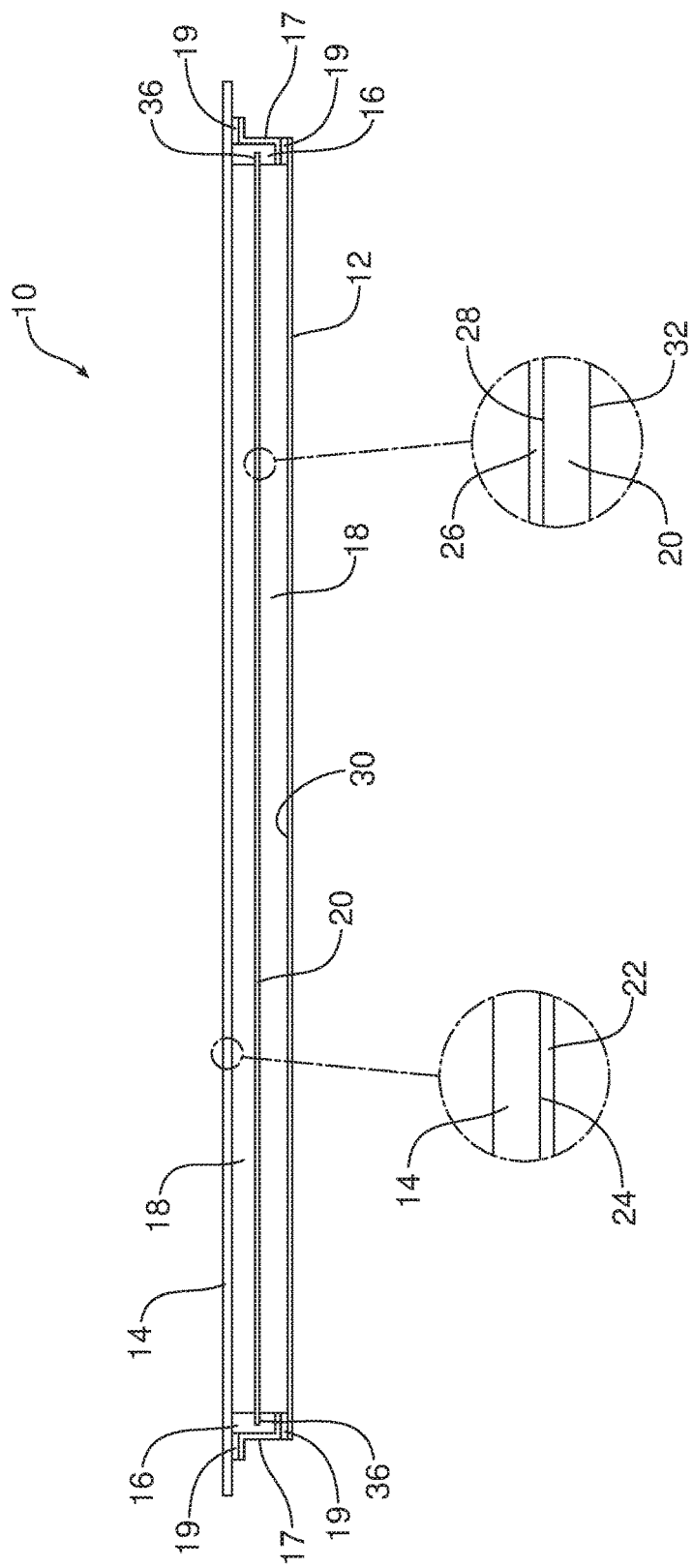

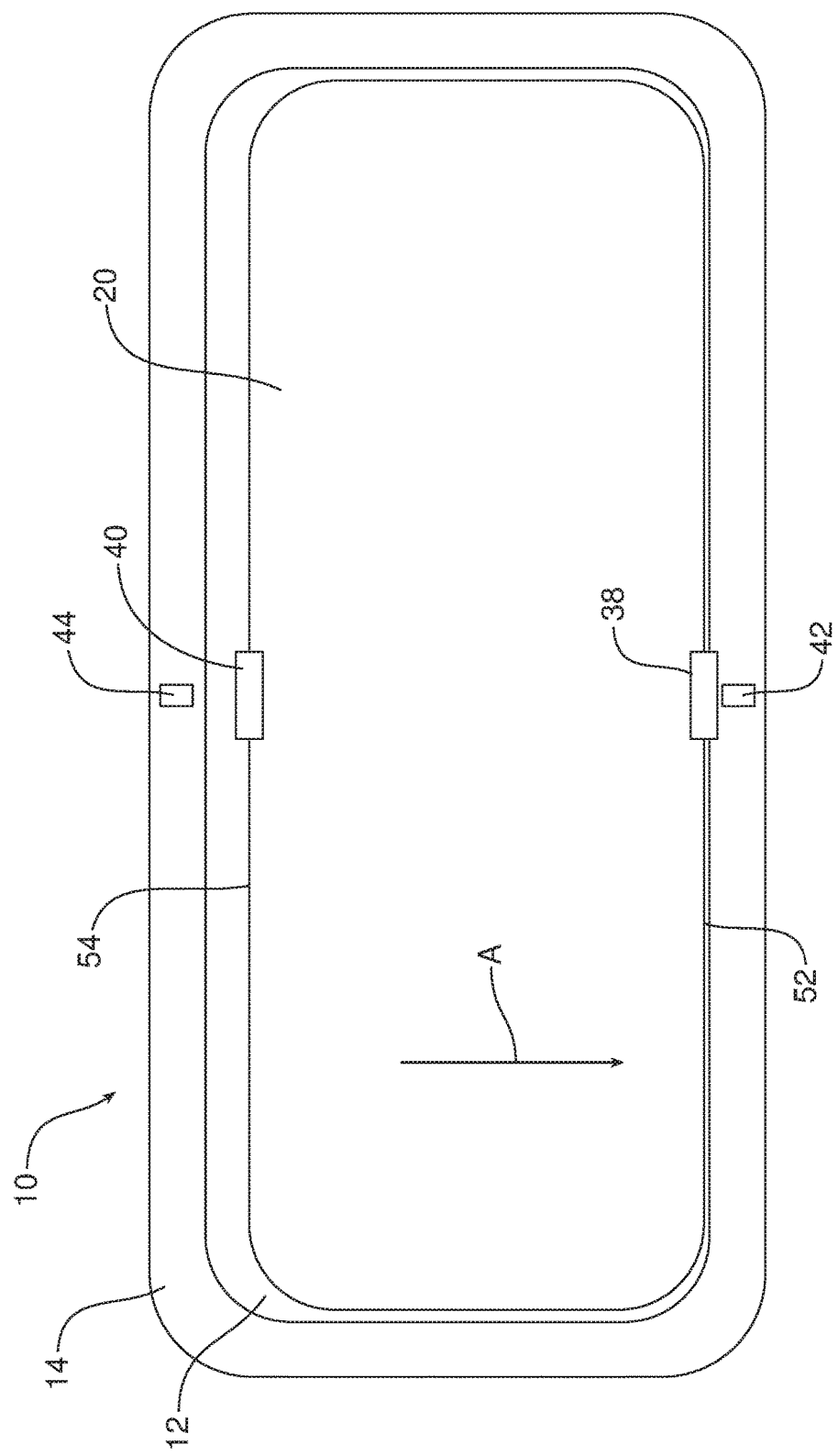

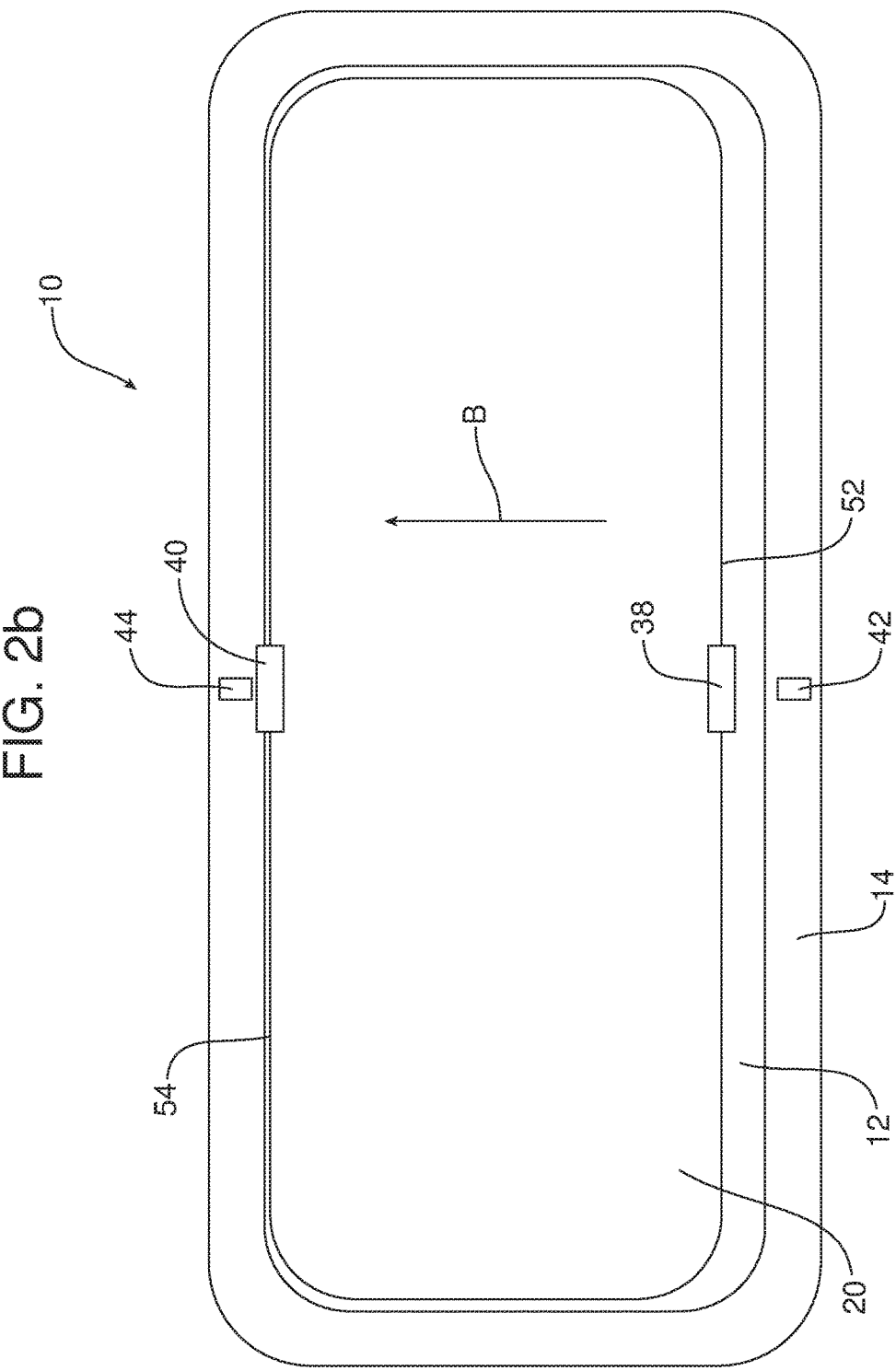

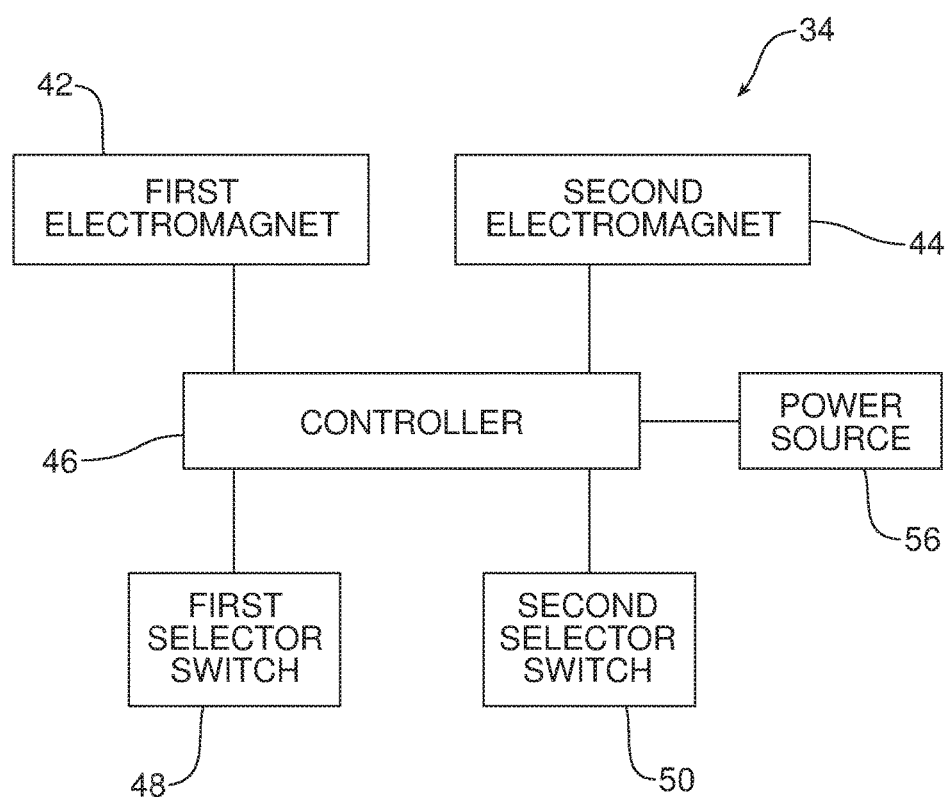

VARIABLE TRANSMISSION MOON ROOF MODULE WITH MULTIPLE TRANSPARENT PANELS

TECHNICAL FIELD

This document relates generally to the motor vehicle equipment field and, more particularly, to a variable transmission moon roof module incorporating a displaceable transparent panel in an environmentally sealed compartment as well as to a method of switching a moon roof module between a transparent state and an opaque state.

BACKGROUND

This document relates to a new and improved moon roof module that is switchable between a transparent state and an opaque state. Toward this end, the moon roof module incorporates a displaceable transparent panel in an environmentally sealed compartment that prevents dust, dirt and moisture intrusion as well as fogging and scratching which might obstruct the clarity of view through the moon roof module.

SUMMARY

In accordance with the purposes and benefits described herein, a variable transmission moon roof module is provided. That moon roof module comprises a first transparent panel, a second transparent panel, and a third transparent panel. The third transparent panel is packaged in a compartment between the first transparent panel and the second transparent panel. The moon roof module also includes an actuator. The actuator is configured to displace the third transparent panel between a first position wherein the moon roof module is in a transparent state allowing the passage of light through the moon roof module into the passenger cabin of a motor vehicle and a second position wherein the moon roof module is in an opaque state preventing the passage of light through the moon roof module into the passenger cabin of the motor vehicle.

The moon roof module may also include a first polarized film on the second transparent panel and a second polarized film on the third transparent panel. The polarized films are of a type that switches between a transparent state and an opaque state with linear translation.

The moon roof module may further include a continuous perimeter wall that extends between the first transparent panel and the second transparent panel. The compartment holding the third transparent panel is defined by the first transparent panel, the second transparent panel and the perimeter wall.

The moon roof module may also include a seal sealing between the first transparent panel and the perimeter wall and the second transparent panel and the perimeter wall so as to environmentally seal the compartment against penetration by dust, dirt and moisture. This ensures a clean unobstructed clarity of view through the moon roof module and, more specifically, the third transparent panel sealed in the compartment. The potential for fogging and scratching of that third transparent panel is essentially eliminated, ensuring long term clarity even when the moon roof module is exposed to adverse environmental conditions commonly associated with the operation of a motor vehicle.

The perimeter wall may also include a guide track. The third transparent panel slides in the guide track between the first position and the second position. In one of many possible embodiments, the guide track comprises two opposed channels.

In at least one of many possible embodiments, the actuator includes a first ferromagnetic element, a second ferromagnetic element, a first electromagnet, a second electromagnet and a controller. The controller allows one to selectively energize the first electromagnet and/or the second electromagnet and displace the third transparent panel between the first position wherein the moon roof module is in a transparent state and the second position wherein the moon roof module is in the opaque state.

More specifically, the first ferromagnetic element may be carried on the third transparent panel adjacent a first edge of the third transparent panel. The second ferromagnetic element may be carried on the third transparent panel adjacent a second edge of the third transparent panel where the first edge is opposite the second edge.

The first electromagnet may be carried on the first transparent panel outboard the compartment juxtaposed to the first ferromagnetic element. The second electromagnet may be carried on the first transparent panel outboard the compartment juxtaposed to the second ferromagnetic element.

In at least one alternative embodiment of a plurality of possible embodiments, the actuator includes a drive motor having a drive shaft connected to a pinion. In addition, the actuator includes a gear rack engaged by the pinion. The gear rack is carried on the third transparent panel and the drive motor is held in the compartment.

In accordance with yet another aspect, a method is provided of switching a moon roof module between a transparent state and an opaque state. That method comprises the steps of: (a) packaging a third transparent panel in a compartment between a first transparent panel and a second transparent panel and (b) displacing, by an actuator, the third transparent panel between a first position wherein the moon roof module is in the transparent state and a second position wherein the moon roof module is in the opaque state.

The method may further include the step of energizing a first electromagnet to displace the third transparent panel into the first position. Further, the method may include the step of energizing a second electromagnet to displace the third transparent panel into the second position.

The method may also include the step of positioning a first ferromagnetic element on the third transparent panel adjacent a first edge thereof. Further, the method may include positioning a second ferromagnetic element on the third transparent panel adjacent a second edge thereof wherein the first edge is opposite the second edge.

Still further, the method may include the step of sealing the compartment holding the third transparent panel. In addition and alternatively, the method may include driving a pinion meshing with a gear rack carried on the third transparent panel in order to displace the third transparent panel between the first position and the second position.

In the following description, there are shown and described several preferred embodiments of the moon roof module as well as the related method of switching a moon roof module between a transparent state and an opaque state. As it should be realized, the moon roof module and the related method are capable of other, different embodiments and their several details are capable of modification in various, obvious aspects all without departing from the moon roof module and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the moon roof module and method and together with the description serve to explain certain principles thereof. In the drawing figures:

FIG. 1 is a schematic cross sectional view of the moon roof module showing the sealed compartment defined by the first transparent panel, the second transparent panel and the perimeter wall as well as the third transparent panel that may be displaced between the first position and the second position.

FIGS. 2a and 2b are respective bottom plan views of the moon roof module illustrated in FIG. 1 showing the third transparent panel in the first position and in the second position.

FIG. 3 is a schematic block diagram of the one possible embodiment of the actuator utilized to displace the third transparent panel between the first position and the second position.

Figure 4:
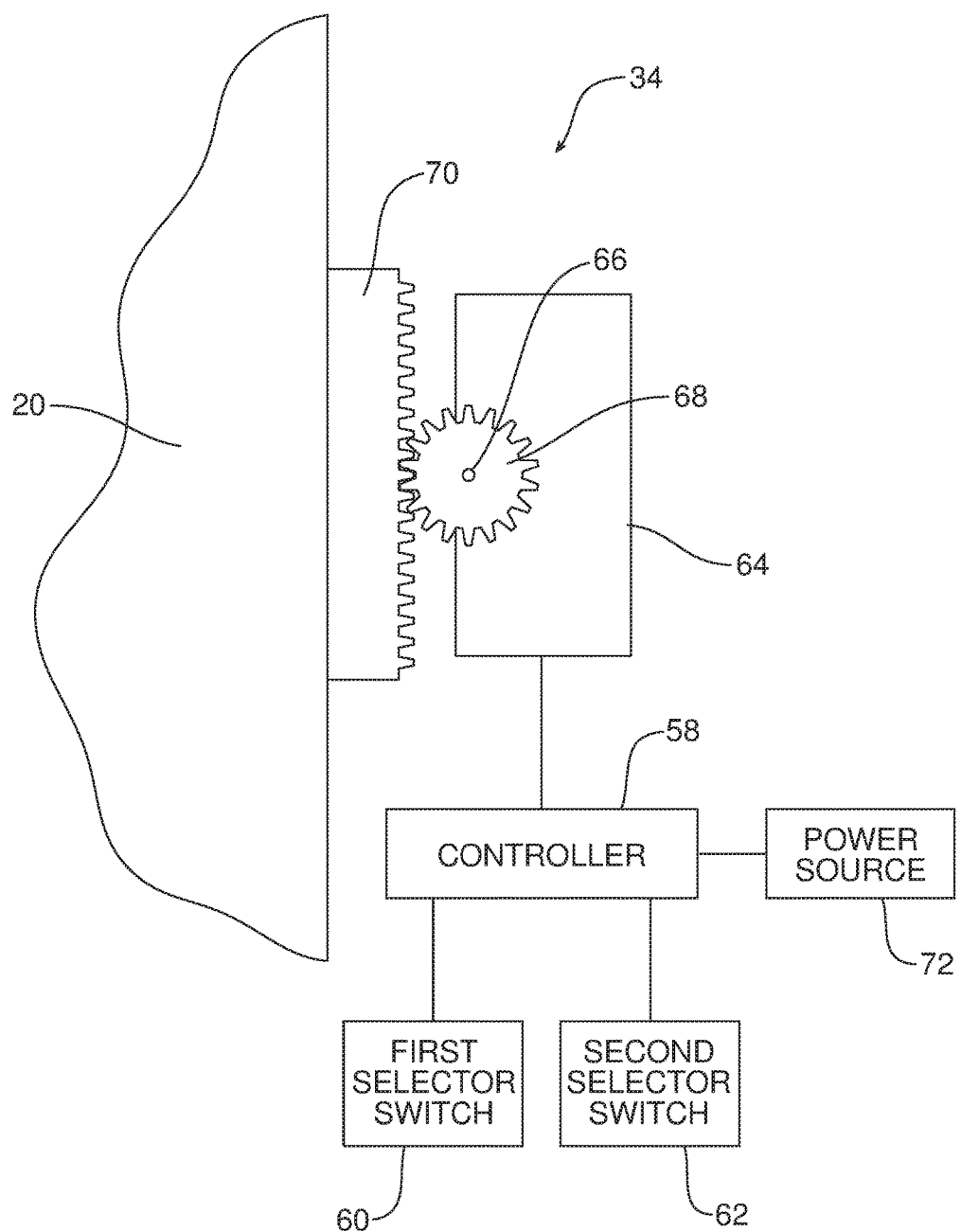
FIG. 4 is a schematic representation of a second possible embodiment of the actuator utilized to displace the third transparent panel between the first position and the second position.

Reference will now be made in detail to the present preferred embodiments of the moon roof module, examples of which are illustrated in the accompanying drawing figures.

DETAILED DESCRIPTION

Reference is now made to FIGS. 1-3 which illustrate a first possible embodiment of the new and improved moon roof module 10. As illustrated, the moon roof module 10 includes a first transparent panel 12, a second transparent panel 14 and a continuous perimeter wall 16 extending between the first transparent panel and the second transparent panel. Together, the first transparent panel 12, the second transparent panel 14, the perimeter wall 16, the Z-bracket 17 and the cooperating urethane, rubber or adhesive seals 19 define an environmentally sealed compartment 18. Note seals 19 sealing between the first transparent panel 12 and the perimeter wall 16 as well as the second transparent panel 14 and the perimeter wall. A third transparent panel 20 is packaged in sealed compartment 18 between the first transparent panel 12 and the second transparent panel 14.

The first transparent panel 12, the second transparent panel 14 and the third transparent panel 20 may be made from any appropriate material including, but not necessarily limited to glass, safety glass, alkali-aluminosilicate sheet glass and clear polymers such as polycarbonate.

In the illustrated embodiment, a first polarized film 22 is laminated to the inner surface 24 of the second transparent panel 14. A second polarized film 26 is laminated to the face 28 of the third transparent panel 20. In other possible embodiments, the first polarized film 22 may be laminated to the inner surface 30 of the first transparent panel 12. Of course, the second polarized film 26 could also be laminated to the second face 32 of the third transparent panel 20 instead of the first face 28.

In any of these embodiments, the first polarized film 22 on the second transparent panel 14 and the second polarized film 26 on the third transparent panel 20 are of a type of polarized film that switches from the transparent state to the opaque state with linear translation.

As best illustrated in FIG. 3, an actuator, generally designated by reference numeral 34, is provided and configured to displace the third transparent panel 20 between a first position, illustrated in FIG. 2a, wherein the moon roof module is in a transparent state to allow the passage of light and a second position, illustrated in FIG. 2b wherein the moon roof module is in an opaque state to prevent the passage of light.

In order to accommodate the displacement of the third transparent panel 20 within the compartment 18, the perimeter wall 16 includes a guide track 36 and the third transparent panel 20 slides in that guide track. In the illustrated embodiment the guide track 36 comprises two opposed channels. Those guide channels may each comprise two pieces for ease of assembling the third transparent channel 20 in the guide track 36.

In the embodiment illustrated in FIGS. 2a, 2b and 3, the actuator 34 includes a first ferromagnetic element 38, a second ferromagnetic element 40, a first electromagnet 42, a second electromagnet 44, a controller 46, a first selector switch 48 and a second selector switch 50.

More specifically, the first ferromagnetic element 38 is carried on or fixed to the third transparent panel 20 adjacent a first edge 52 of that third transparent panel while the second ferromagnetic element 40 is carried on or fixed to the third transparent panel adjacent a second edge 54 of that third transparent panel. As should be appreciated the first edge 52 is opposite the second edge 54.

The controller 46 may be a computing device such as a dedicated microprocessor or electronic control unit (ECU) operated in accordance with instructions from appropriate control software. Thus, the controller 46 may comprise one or more processors, one or more memories and one or more network interfaces all in communication with each other over a communication bus. The controller 46 is configured to selectively energize the first electromagnet 42 and/or the second electromagnet 44 and displace the third transparent panel 20 between the first position and the second position.

In the illustrated embodiment, the first electromagnet 42 is carried on or fixed to the first transparent panel 12 outboard of the compartment 18 and juxtaposed to the first ferromagnetic element 38. The second electromagnet 44 is carried on or fixed to the first transparent panel 12 outboard of the compartment 18 juxtaposed to the second ferromagnetic element 40.

When an operator manipulates the first selector switch 48, the controller 46 energizes the first electromagnet 42 by directing power from the power source 56 to the first electromagnet. When energized, the first electromagnet produces a magnetic field that draws the first ferromagnetic element 38 and the third transparent panel 20 to which the first ferromagnetic element is fixed in the direction of action arrow A thereby displacing the third transparent panel into the first position illustrated in FIG. 2a. In this first position, the first polarized film 22 on the second transparent panel 14 is oriented with respect to the second polarized film 26 on the third transparent panel 20 so that the moon roof module is in a transparent state allowing the passage of light. After a predetermined period of time necessary to complete the displacement of the third transparent panel 20 into the first position, the controller 46 interrupts power to the first electromagnet 42.

When the operator desires to suspend the passage of light through the moon roof module, the operator manipulates the second selector switch 50. In response, the controller 46 directs power from the power source 56 to the second electromagnet 44. The second electromagnet 44 then produces a magnetic field that draws the second ferromagnetic element 40 and the third transparent panel 20 fixed thereto in the direction of action arrow B displacing the third transparent panel into the second position as illustrated in FIG. 2b. In the second position, the first polarized film 22 on the second transparent panel 14 is oriented with respect to the second polarized film 26 on the third transparent panel 20 so as to prevent the passage of light. As a result, the moon roof module 10 is in the opaque state. After a predetermined period of time necessary to complete the displacement of the third transparent panel 20 into the second position, the controller 46 de-energizes the second electromagnet 44.

In another possible embodiment, both of the electromagnets 42, 44 may be energized simultaneously to displace the third transparent panel 20 in a desired direction. More specifically, the first electromagnet 42 could be energized so as to provide a repelling force while the second electromagnet 44 is energized so as to provide an attracting force to move (simultaneously push and pull) the third transparent panel 20 in a first direction. In contrast, the first electromagnetic 42 could be energized so as to provide an attracting force while the second electromagnet 44 is energized so as to provide a repelling force to move (simultaneously pull and push) the third transparent panel in a second direction.

As should be appreciated, the operator may use the first selector switch 48 and the second selector switch 50 as often as desired to switch the third transparent panel 20 between the first position, wherein the moon roof module is in a transparent state allowing the passage of light, and the second position, wherein the moon roof module is in an opaque state preventing the passage of light.

It should be appreciated that the actuator 34 illustrated in FIG. 3 relies upon magnetism with no mechanical device actually contacting the third transparent panel 20 to displace that third transparent panel between the first position and the second position. Here it should be noted that the actuator 34 may take other forms. For example, as illustrated in FIG. 4, the actuator 34 comprises a controller 58 having a first selector switch 60 and a second selector switch 62. The controller is connected to a drive motor 64 having a drive shaft 66 connected to a pinion 68. Pinion 68 meshes with a gear rack 70 carried on the third transparent panel 20. A second drive motor 64, drive shaft 66, pinion 68 and a meshing gear rack 70 (not shown) may be provided on the opposite side of the third transparent panel 20 in order to ensure balanced simultaneous application of displacement force for smooth operation of the third transparent panel 20 when displaced between the first and second positions.

In this embodiment, when one manipulates the first selector switch 60, the controller directs power from the power source 72 to energize the drive motors 64 to drive the pinions 68 and displace the gear racks 70 as well as the third transparent panel fixed thereto into the first position wherein the moon roof module 10 is in a transparent state. In contrast, when one manipulates the second selector switch 62, the controller 58 functions to energize the drive motors 64 and drive the pinions 68 in the opposite direction to displace the gear racks 70 and the third transparent panel 20 fixed thereto into the second position wherein the moon roof module is in an opaque state.

Figure 5:
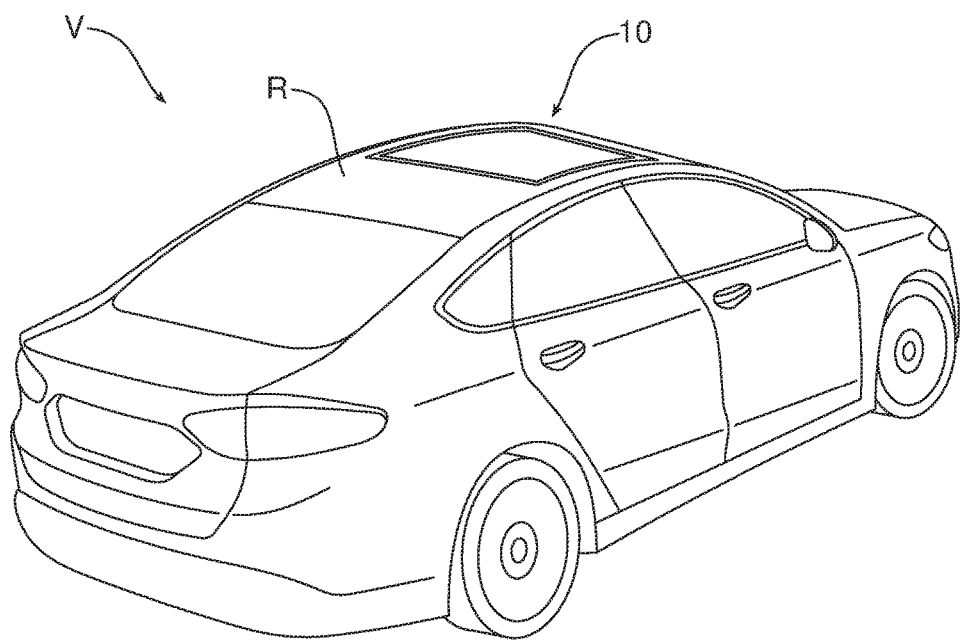
FIG. 5 illustrates the moon roof module of FIG. 1 on a motor vehicle.

FIG. 5 illustrates the moon roof module 10 in the roof R of a motor vehicle V.

Consistent with the above description, a method is provided for switching a moon roof module 10 between a transparent state illustrated in FIG. 2a and an opaque state illustrated in FIG. 2b. That method includes the steps of packaging a third transparent panel 20 in a compartment 18 between a first transparent panel 12 and a second transparent panel 14 and displacing, by an actuator 34, the third transparent panel between a first position wherein the moon roof module 10 is in the transparent state and a second position wherein the moon roof module is in the opaque state.

The method may also include the step of energizing a first electromagnet 42 to displace the third transparent panel 20 to the first position. Further, the method may also include the step of energizing a second electromagnet 44 to displace the third transparent panel 20 into the second position. Still further, the method may include the steps of positioning a first ferromagnetic element 38 on the third transparent panel 20 adjacent a first edge 52 and positioning a second ferromagnetic element 40 on the third transparent panel adjacent a second edge 54 opposite the first edge.

The method may also include the step of sealing the compartment 18 with the seal 19 as well as the alternative step of driving a pinion 68 meshing with a gear rack 70 carried on the third transparent panel 20 as illustrated in FIG. 4.

The foregoing has been presented for purposes of illustration and description. It is not intended to be exhaustive or to limit the embodiments to the precise form disclosed. Obvious modifications and variations are possible in light of the above teachings.

For example, in the FIG. 3 embodiment, the actuator 34 relies upon cooperating ferromagnetic elements 38, 40 and electromagnets 42, 44 to displace the third transparent panel 20 between the first and second positions. In FIG. 4 the actuator 34 relies upon drive motors 64 and cooperating pinions 68 and gear racks 70 to displace the third transparent panel between the first position and the second position. It should be appreciated that other actuator arrangements may be utilized including, for example, a linear actuator and a gear actuated linkage. In addition, while the above-described embodiments of the moon roof module 10 include automated mechanical and electromechanical actuators, the actuator 34 could be a manual handle or knob connected to the third transparent panel and projecting out of the sealed compartment 18 through an O-ring seal. Further, while the illustrated embodiment relates to a moon roof module 10 wherein the third transparent panel 20 is displaced fore and aft to switch between the transparent state and the opaque state, it should be appreciated that the moon roof module could be configured to displace the third transparent panel side-to-side or laterally to achieve the same end. All such modifications and variations are within the scope of the appended claims when interpreted in accordance with the breadth to which they are fairly, legally and equitably entitled.

What is claimed is:

1. A moon roof module, comprising:
   a first transparent panel;
   a second transparent panel;
   a third transparent panel packaged completely within a compartment between said first transparent panel and said second transparent panel;
   a perimeter wall extending between said first transparent panel and said second transparent panel, said compartment being defined by said first transparent panel, said second transparent panel and said perimeter wall;
   a first seal sealing between the first transparent panel and the perimeter wall and a second seal sealing between the second transparent panel and the perimeter wall so as to environmentally seal the compartment;

an actuator configured to displace said third transparent panel within the compartment between a first position wherein said moon roof module is in a transparent state and a second position wherein said moon roof module is in an opaque state;

a first polarized film on said second transparent panel; and a second polarized film on said third transparent panel;

wherein the second transparent panel and the third transparent panel switch the moon roof module from said transparent state to said opaque state with linear translation of the third transparent panel.

2. The moon roof module of claim 1, wherein said perimeter wall includes a guide track and said third transparent panel slides in said guide track.

3. The moon roof module of claim 2, wherein said guide track comprises two opposed channels.

4. The moon roof module of claim 2, wherein said actuator includes a first ferromagnetic element, a second ferromagnetic element, a first electromagnet, a second electromagnet and a controller for selectively energizing said first electromagnet and/or said second electromagnet and displacing said third transparent panel between said first position and said second position.

5. The moon roof module of claim 4, wherein said first ferromagnetic element is carried on said third transparent panel adjacent a first edge of said third transparent panel and said second ferromagnetic element is carried on said third transparent panel adjacent a second edge of said third transparent panel where said first edge is opposite said second edge.

6. The moon roof module of claim 5, wherein said first electromagnet is carried on said first transparent panel outboard said compartment juxtaposed to said first ferromagnetic element and said second electromagnet is carried on said first transparent panel outboard said compartment juxtaposed to said second ferromagnetic element.

7. The moon roof module of claim 3, wherein said actuator includes a drive motor having a drive shaft connected to a pinion and a gear rack engaged by said pinion.

8. The moon roof module of claim 7, wherein said gear rack is carried on said third transparent panel and said drive motor is held in said compartment.

9. A method of switching a moon roof module between a transparent state and an opaque state, comprising:

packaging a third transparent panel completely within a sealed compartment between a first transparent panel and a second transparent panel, said compartment being environmentally sealed with a perimeter wall sealed to the first transparent panel and sealed to the second transparent panel, wherein the second transparent panel includes a first polarized film and the third transparent panel includes a second polarized film; and displacing, by an actuator, said third transparent panel within the sealed compartment between a first position wherein said moon roof module is in said transparent state and a second position wherein said moon roof module is in said opaque state.

10. The method of claim 9, including energizing a first electromagnet to displace said third transparent panel into said first position.

11. The method of claim 10, including energizing a second electromagnet to displace said third transparent panel into said second position.

12. The method of claim 11, including positioning a first ferromagnetic element on said third transparent panel adjacent a first edge thereof.

13. The method of claim 12, including positioning a second ferromagnetic element on said third transparent panel adjacent a second edge thereof wherein said first edge is opposite said second edge.

14. The method of claim 9, including driving a pinion meshing with a gear rack carried on said third transparent panel.

* * * * *